United States Patent Office 3,400,051
Patented Sept. 3, 1968

3,400,051
PROCESSES FOR TREATING FLUIDS WITH
GASES IN A VESSEL
Josef Hofschneider, Gramatneusiedl, Lower Austria, Austria, assignor to Patentauswertung Vogelbusch Gesellschaft m.b.H., Vienna, Austria, an Austrian company
Filed Apr. 19, 1965, Ser. No. 449,258
Claims priority, application Austria, May 8, 1964,
A 4,029/64
7 Claims. (Cl. 195—142)

ABSTRACT OF THE DISCLOSURE

The treatment of fluids with gases in which a rotatable gas injector is located within a vessel and at least three vertically mounted baffles are connected to the vessel wall for preventing the fluid from rotating with the injector. One vertical edge of each baffle is connected to one side of one of two adjacent baffles and the other vertical edge to the vessel's inner wall. The injector and central area defined by the inner walls of the baffles are in the vessel's central portion and the injector is located below the baffles and rotatable about a vertical axis.

---

This invention relates to apparatus for treating fluids with gases in a vessel, and more particularly for aerating fermentation fluids in a fermentation vat provided with a rotatable gas injector, preferably in the form of an aerating propeller, and three or more vertically mounted baffles are fastened to the walls of the vessel to prevent the fluid from rotating with the injector.

Treating fluids with gas or air by means of a gas injector, preferably in the form of an aerating propeller, rotating in the fluid has proved to be very suitable in many cases. This type of air treatment has found many applications, particularly in the refining industry since especially good aerating action can be achieved with low energy consumptions.

However, it has been found that such apparatus can only operate satisfactorily if the fluid is prevented from rotating in the vessel with the rotating gas injector. If this is not done, the fluid climbs up the walls of the vessel until, due to the centrifugal and gravity forces, the surfaces of the fluid form a rotation paraboloid the vertex of which is deeper the faster the gas injector rotates. The effective capacity of the vessel is considerably decreased in this way. Besides this, the centrifugal forces cause the fluid and the gases introduced into it to separate out more rapidly (centrifugal effect) since the densities of the two media differ sharply. This means that the gas fed in is removed from the fluid very fast so that the aerating effect is diminished. Further, the rotation of the fluid gives rise to oscillations of the fluid which are transferred to the walls and base of the vessel and can cause cracks in the material. These oscillations arise because the streaming in gas-fluid mixtures is usually not stationary but highly periodic. The great intensity of these oscillations is due to the fact that the gas-fluid mixture on the one hand has a high compressibility due to the gas and on the other hand a relatively high density due to the fluid.

It is a known practice to prevent the fluid from rotating by providing fixed baffles arranged radially with respect to the axis of rotation below and/or above the gas injector, preferably in the form of an aerating propeller. These baffles are joined to the base or walls of the vessel. This arrangement of the radially mounted baffles prevents the fluid from rotating but the baffles are subject to high mechanical stresses due to the aerating propeller with two or more radially mounted vanes to produce a particularly good aerating effect. Each time that a vane of a propeller of this type passes one of the radially mounted baffles, the baffle is subjected to a strong thrust. The baffles are frequently broken in this way. In accordance with the "action and equal reaction" principle, there are also equally large thrusts in the opposite direction on the vanes, so that these are also liable to break.

Further devices for preventing the fluid from rotating are known whereby instead of baffles there are horizontal rods. In apparatus of this type, the fluid is treated with gas or air by means of an injector in the form of a hollow perforated element rotating in the vessel containing the fluid and driven by the hollow shaft containing the air inlet. The rods impeding rotation of the fluid are divided into one or more groups arranged above the rotating injector, with each group consisting of rods arranged more or less vertically above one another. These pass at a small separation from the hollow shaft. One or both ends of the rods are connected to the walls of the container. In particular, two groups of rods are arranged symmetrically with respect to the axis of rotation so that each group has an opposite end not in contact with the wall of the vessel. The object of this arrangement is to make a gap between the ends of the rods not in contact with the vessel wall and the vessel wall so that the space between the two groups can be traversed easily. In this known arrangement, each group of rods, which preferably have circular cross-sections, forms a grid which inhibits the fluid from rotating with the rotating injector, but it only stops it to a certain extent and does not prevent it entirely. Because of the small braking effect of this type of rod grid the forces acting on it are smaller than when the radial baffles are used and the thrusts are not as great. However, since the rotation of the fluid is not entirely prevented by the rod grid but only diminished, the same disadvantages arise, though to a lesser extent, as in the case where no means are provided to prevent or decrease the rotation of the fluid.

In accordance with the invention the above-mentioned disadvantages are avoided in an apparatus of the type previously mentioned by joining one of the vertical edges of each baffle with one side of one of two adjacent baffles while the other vertical edge of each baffle is fastened to the inner wall of the vessel. In this arrangement the baffles are not mounted radially with respect to the axis of rotation. Thus, in the direction of the axis of rotation of the aerating propeller, the vanes and the baffles only intersect in points. Therefore with the arrangement in accordance with the invention, the strong thrusts occurring in the case of the radially mounted baffles are avoided from the outset while at the same time the fluid is braked more effectively than with the rod grid. However, even when the thrusts are eliminated, the baffles are still subject to considerable forces, since, in accordance with the "action-reaction" principle, they must absorb the torsion effects due to the rotating gas injector, preferably an aerating propeller. A further considerable advantage of the arrangement in the invention is that the baffles are combined to form a kind of framework without any additional connecting pieces between the baffles being required.

In the case of a cylindrical fluid vessel all the interconnected baffles can be equal and congruent despite the fact that they are joined together. The streaming action and mechanical stresses are then the same for each baffle. Also the production of the baffles is simplified if they are all the same.

When fluids are treated with gases or air in a vessel, it is known that the optimum aerating effect is achieved if the fluid is circulated cyclically. Only if all the particles of the fluid in the vessel circulate in this way and thus pass close to the rotating gas injector, preferably in the form of an aerating propeller, are all the particles of the fluid aerated to the same degree. For this reason it is convenient to produce an air lift pump effect with the gas introduced to aerate the fluid to give the desired circulation of the fluid particles since no additional energy consumption is then required. Such an air lift pump effect can only be achieved if walls for the circulating fluid are arranged inside the vessel, as is known per se. In a further embodiment of the object in the invention, to achieve an air lift pump effect of this kind, the channels formed by the interconnected baffles and the inner wall of the vessel merely lie above the inlet apertures of the gas injector. This arrangement means that the gas fed into the fluid from the gas injector and forming bubbles in the fluid passes into the outer channels in the course of its outward motion, rises there and for the most part escapes through the surface of the fluid. This means that the bubble content of the outer channels is considerably higher than in the remaining channel bounded by the baffles e.g. the density of the gas-fluid mixture is correspondingly smaller in the outer channels than in the inner channel. This density difference causes the gas-fluid mixture in the outer channels to rise while the fluid with a lower gas content flows downward in the inner channel thus giving the desired air lift pump effect. In view of the higher amount of gas in the outer channels it is advantageous if the sum of the horizontal cross-sections of the outer channels is greater than the horizontal cross-section of the inner channel.

If the lower edges of the baffles are sharp they can give rise to a periodic formation of eddies which lead to fluctuations in the fluid-gas mixtures. As mentioned before the mixture has a high compressibility due to the gas and also a relatively large density due to the fluid so that these oscillations are large and are transmitted to the baffles. Even when the system is reinforced, the material of the baffles may be damaged, particularly in the zones adjacent to the aerating propeller. To avoid harmful eddies being formed at the lower edges of the baffles, these lower edges are rounded off or, at least above the outlet apertures for the gas injector, curved in the direction of rotation of this injector. In this way the streaming behaviour of the baffles is considerably improved. Besides this, the measures mentioned strengthen the baffles at the points at which they are subject to the greatest mechanical stresses. In this way damage to the baffles is entirely avoided. The slight lowering of the braking action due to these measures is not significant since the fluid in the outer channels between the baffles and the wall of the vessel cannot rotate with the gas injector. Besides since there are internal frictional forces at the lower edge of the baffles there are strong frictional forces between the fluid layers held by the baffles and the fluid layers rotating with the gas injector so that there should still be considerable braking action even at some distance below the baffles. Detailed investigations have shown that this is true. It has been established that, particularly with highly viscous fluids, as for example the high concentration yeast mashes and the mashes for citric acid fermentation, it is advantageous to make the vertical separation between the upper side of the gas injector, preferably in the form of an aerating propeller, and the lower edges of the parts of the baffles lying above the outlets in the latter, relatively large. When gas injectors, preferably in the form of aerating propellers, are used which separated the gas into small bubbles, the factor determining the vertical separation of these is the ratio between this separation and the radius of the gas injector. In general the best results are obtained, both with respect to avoiding fluctuations and to the power required to drive the rotating gas injector, if this ratio lies between 0.2 and 1.0. The smaller value holds for fluids with smaller viscosities, and the larger for fluids with high viscosities, for example mashes for citric acid fermentation, highly concentrated yeast mashes etc. Maintaining the given ratio is especially advantageous if the gas injector is in the form of an aerating propeller the arms of which have open grooves on the side away from the direction of rotation so that the cross-sections of the arms correspond to the front part of stream line profiles which are completed as whole stream profiles by the phase boundaries of the vacuoles formed by the rotation of the gas injector. The lower edges of the parts of the baffles forming the inner channel can lie below the lower edges of the parts of the baffles forming the outer channels.

In many cases, such as e.g. in the process of yeast multiplication, exothermal chemical reactions take place during the aerating process so that the fluid has to be cooled with cooling water, iced water, cooling brine etc. during treatment. Sometimes a fluid is heated in the vessel used for the aerating process. It may, for example, be a fluid introduced into the vessel for cleaning or disinfecting which is heated with condensing steam. In the latter case it is often valuable to recover the condensate which can only be achieved by heating the fluid indirectly through heat-conducting walls. For these reasons the baffles may, in the known way, have hollow spaces for passing a cooling or heating medium.

The accompanying drawing represents an embodiment of the invention. It shows:

FIGURE 4 is an end view of the baffle shown in FIGURE 3 with an aerating vane passing by.

Figure 1:
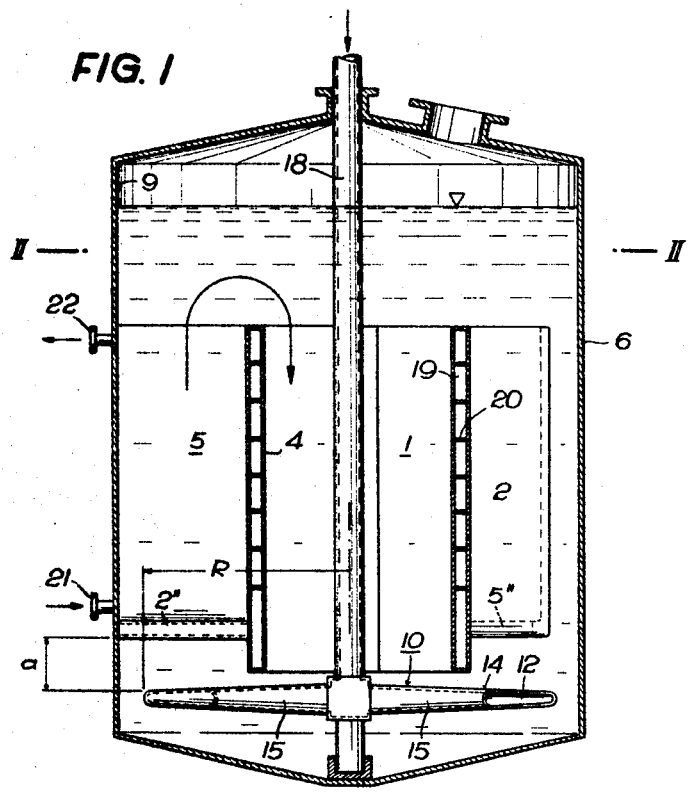
FIGURE 1 is a view partly in elevation and partly in vertical section of the apparatus in accordance with the invention.

The baffles provided in a vessel 6, for example a fermentation vat, are denoted by 1–5. Each baffle has a vertical edge 7 which is in contact with one side of one of two adjacent baffles. Thus the baffle 1 is joined by its vertical edge 7 to a side 5' of the adjacent baffle 5 and the latter baffle is joined to side 4' of the baffle 4 etc. The other vertical edge 8 of each of the baffles 1–5 is connected to inner wall 9 of the vessel 6. Thus each baffle is joined on one side to one side of one of two adjacent baffles and on the other side to the inner wall of the vessel and, between these two joints, is also connected to the vertical edge of the other adjacent baffle. In the case of the baffle 1, this other baffle is the baffle 2, and for the latter baffle it is baffle 3 etc. The framework formed in this way by connecting together all the baffles reinforces the baffles with respect to one another and to the vessel and the whole system, particularly the baffles, is strengthened which eliminates breakages.

If the vessel 6 is cylindrical, the directly interconnected baffles 1–5 can all be congruent and equal so that the reaction forces arising from the rotation of a gas injector 10 are distributed equally between the individual baffles and also the production of the apparatus is considerably simplified.

Outer channels 11 formed by the inner wall 9 of the vessel 6 and the inter-connected baffles lie above outlets 12 of the two-armed gas injector 10 so that the air lift pump effect already described is achieved and can develop completely since the fluid rising through the outer channels 11 is bounded by the baffles 1–5 thus preventing rotation of this fluid which would destroy the air lift effect. The sum of the horizontal cross-sections of the outer channels 11 should be greater than the horizontal cross-section of inner channel 13 bounded by the baffles.

Figure 2:
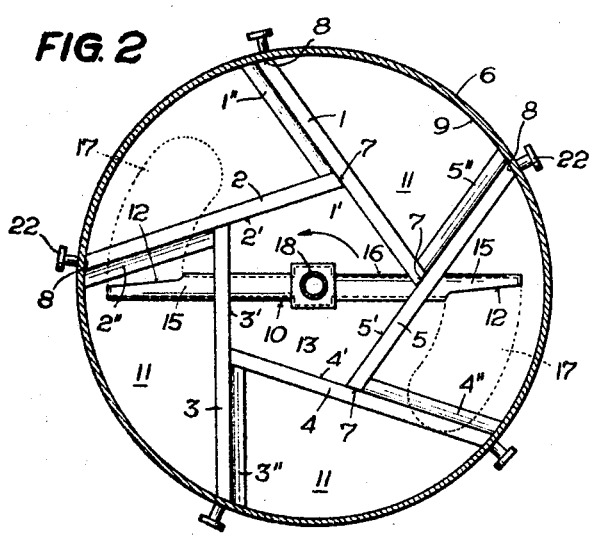
FIGURE 2 is a view taken along the line II—II in FIGURE 1.
Figure 3:
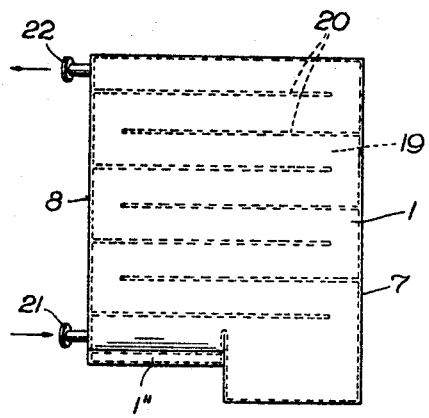
FIGURE 3 is a front view of a baffle.
Figure 4:
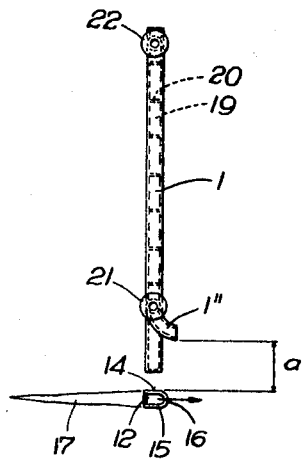

For the reasons already given, lower edges 1''–5'' of the baffles lying above the outlets 12 of the gas injector are curved in the direction of rotation of the gas injector. The vertical separation of upper side 14 of the gas injector 10 from the lower edges 1''–5'' of the baffles is denoted at $a$. R is the radius of the gas injector. The ratio $a/R$ lies between 0.2 and 1.0, and as already mentioned, is chosen according to the viscosity of the fluid to be treated. The lower edges of the parts of the baffles 1–5 forming the inner channel 13 lie below the lower edges 1″–5″ of the parts of the baffles forming the outer channels 11 (see FIGURE 3). Arms 15 of the gas injector in the form of an aerating propeller are open grooves on the side away from the direction of rotation so that their cross-section corresponds to front part 16 of a streamline profile (FIGURE 4) which is completed as an entire streamline profile by the phase boundaries of vacuoles 17 formed by the rotation of the gas injector, as can be seen from FIGURE 4 and as shown in FIGURE 2 by the dotted lines. The gas or air is fed to the aerating arms 15 through hollow drive shaft 18 of the gas injector 10 which is normally driven from below. In accordance with the example shown the aerating propeller has two arms; however, propellers with three or more arms can obviously be used.

The baffles 1–5 connected to one another and to the vessel 6 as described and at some distance from the gas injector 10, have hollow spaces 19 through which cooling or heating media can be passed. 20 are the guides for these media in the hollow spaces 19, the media entering through a connecting piece 21 and leaving through a connecting piece 22.

I claim:

1. Apparatus for treating fluids with gases in a fermentation vessel, comprising a rotatable gas injector, at least three vertically mounted baffles connected to the wall of the vessel to prevent the fluid from rotating with the gas injection means, one of the vertical edges of each baffle being connected to one side of one of the two adjacent baffles, the other vertical edge of each baffle being fastened to the inner wall of the vessel, said gas injector means and central area defined by the inner walls of the baffles being in the central portion of the vessel, and said gas injector means being located below the baffles and rotatable about a vertical axis.

2. Apparatus as claimed in claim 1, in which the vessel is cylindrical and all of the interconnected baffles are congruent and equal.

3. Apparatus as claimed in claim 2, in which outer channels formed by the inner wall of the vessel and the interconnected baffles lie above outlets of the gas injector means.

4. Apparatus as claimed in claim 3, in which the lower edges of the baffles are, at least above the outlets of the gas injector means, curved in the direction of rotation of the gas injector means.

5. Apparatus as claimed in claim 4, in which the ratio $a/R$ of a vertical separation $a$ between the upper side of the gas injector means and the lower edges of the parts of the baffles lying above the outlets in the gas injector means to the radius $R$ of the gas injector means lies between 0.2 and 1.0.

6. Apparatus as claimed in claim 5, in which the lower edges of the parts of the baffles forming an inner channel lie below the lower edges of the parts of the baffles forming the outer channels.

7. Apparatus as claimed in claim 6, in which the baffles are provided with hollow spaces for allowing heat exchange media to pass therethrough.

References Cited

UNITED STATES PATENTS

| 1,242,445 | 10/1917 | Ittner | 261—87 |
| 3,092,678 | 6/1963 | Braun | 261—87 |

ALVIN E. TANENHOLTZ, *Primary Examiner.*

N. ROSKIN, *Assistant Examiner.*